S. Samuels.
Ship Furniture.
N° 23,045. Patented Feb. 22, 1859.
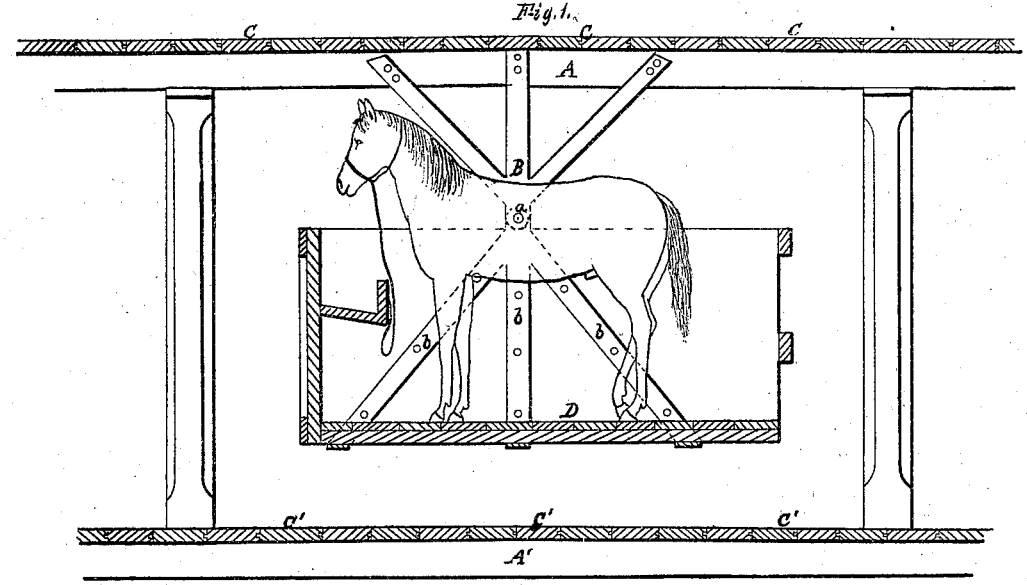
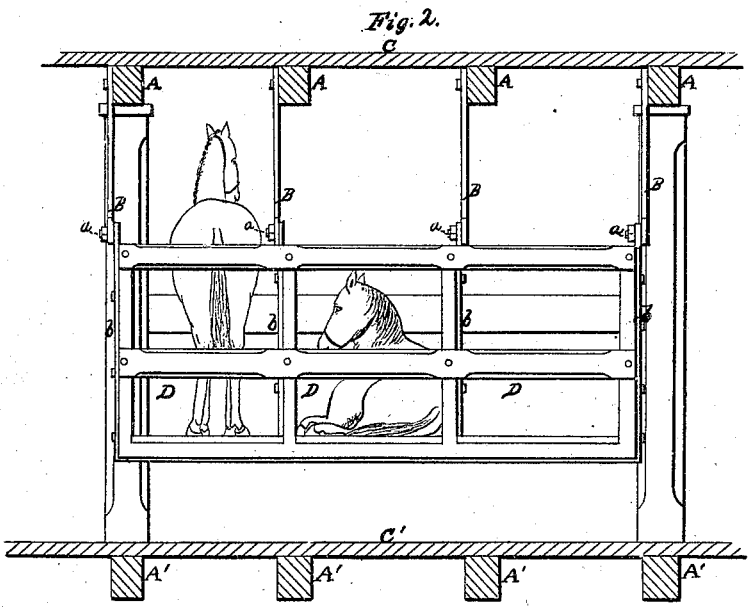
Witnesses:
Henry T. Brown
J. Wade
Inventor:
S. Samuels

UNITED STATES PATENT OFFICE.

SAMUEL SAMUELS, OF BROOKLYN, NEW YORK.

STALL FOR HORSES ON SHIPBOARD.

Specification of Letters Patent No. 23,045, dated February 22, 1859.

*To all whom it may concern:*

Be it known that I, SAMUEL SAMUELS, of the city of Brooklyn, in the county of Kings and State of New York, have invented a new and Improved Mode of Applying Horse-Boxes on Board of Ships or other Vessels; and I do hereby declare that the following is a full, clear, and exact description of the same, reference being had to the accompanying drawings, forming part of this specification, in which—

Figure 1, is a longitudinal vertical section of a horse box applied according to my invention, between the decks of a ship. Fig. 2, is a back-end view of three connected boxes applied in a similar manner.

Similar letters of reference indicate corresponding parts in both figures.

In the transportation of horses by sea, they have always previous to my invention been liable to much injury from the motion,—particularly the rolling,—of the vessels on board of which they are carried, as they have always been placed in fixed boxes or stalls, and the only means adopted for their protection has been the padding of the insides of their boxes or stalls, and the placing of broad slings under their bellies to relieve their legs.

My invention is intended to enable them to be carried without such injury, and to this end the nature of my invention consists in suspending a horse box on board a ship or other vessel, on pivots or centers which are arranged transversely to the box itself but parallel, or thereabouts with the length of the vessel, and in such a manner that the box will be caused by the force of gravitation to remain with its bottom or floor in a horizontal or nearly horizontal position, notwithstanding the most violent rolling of the vessel, and thus in a great measure prevent the horses being thrown against its sides or ends.

It further consists in combining a series of two or more so-suspended boxes, by arranging them side by side with their suspending pivots in line with each other and fastening them together so that all will remain stationary or swing simultaneously, and the weight of the several boxes and of the horses in all but the one will tend to prevent any swinging movement being produced by the sudden movements of the horse in any one of the series.

To enable others to apply my invention, I will proceed to describe it with reference to the drawings.

A, A, A', A', are the beams, and C, C, C', C', the planks of the decks of a vessel, and B, B, are iron hangers bolted securely to the beams A, of the upper deck to receive the pins or pivots $a$, $a$, which attach the horse boxes, D, D, D,. The boxes have iron straps $b$, $b$, secured to them, and these straps serve to attach the boxes at each side to the pins or pivots $a$, $a$. The said pins or pivots have their axes all in line with each other, at right angles to the length of the boxes and parallel with a plane passing vertically through the center of the vessel, and they are arranged at such a distance from the bottoms or floors of the boxes as to come nearly opposite or just above the middle of the bodies of the horses when standing upright in the boxes, and the boxes are suspended with their bottoms so far above the lower deck that while on a level they will clear the deck during any ordinary rolling of the vessel.

The three boxes exhibited in Fig. 2, are all built together, but when two or more boxes are combined to swing together in the same manner they may be built separately and bolted together.

By suspending horse boxes in the manner above described, either singly, or in a connected series of two or more, and thus permitting them to oscillate athwart ships, the boxes, if well balanced, are caused by gravitation to keep their bottoms horizontal so far as their length is considered, and render them independent of the rolling of the vessel which is the only movement of serious consequence; and, when thus suspended, the boxes may be made large enough for the horses to lie down, and when a number of boxes are combined as described, the horse in any one box may get up and lie down without materially disturbing the equilibrium of the series of boxes, as the weight of the whole series tends to keep each one on a level, and so does the weight of the horses in the other boxes.

In vessels in which it is not convenient, or in which there is not height enough to suspend the boxes between decks, they may be suspended in a similar manner on pins or pivots secured in uprights erected on the deck.

What I claim as my invention and desire to secure by Letters Patent, is

1. Suspending a horse box on board of a ship, or other vessel, on pivots or centers, having their axes arranged transversely to the box and parallel or thereabouts with the length of the vessel, substantially as and for the purpose herein set forth.

2. And I also claim:—Combining a series of two or more so-suspended boxes, substantially as and for the purpose herein described.

S. SAMUELS.

Witnesses:
 HENRY T. BROWN,
 I. WADE.